(12) United States Patent
Keller et al.

(10) Patent No.: US 8,246,250 B2
(45) Date of Patent: Aug. 21, 2012

(54) BEARING ARRANGEMENT

(75) Inventors: Karl Keller, Hilchenbach (DE); Konrad Roeingh, Hilchenbach (DE)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 292 days.

(21) Appl. No.: 12/735,257

(22) PCT Filed: Jan. 12, 2009

(86) PCT No.: PCT/EP2009/000115
§ 371 (c)(1),
(2), (4) Date: Jun. 24, 2010

(87) PCT Pub. No.: WO2009/087114
PCT Pub. Date: Jul. 16, 2009

(65) Prior Publication Data
US 2010/0284639 A1     Nov. 11, 2010

(30) Foreign Application Priority Data
Jan. 11, 2008 (DE) .................. 10 2008 004 113

(51) Int. Cl.
*F16C 13/06* (2006.01)

(52) U.S. Cl. ........................ 384/418; 384/192
(58) Field of Classification Search .................. 384/192, 384/215, 276, 416–419, 428
See application file for complete search history.

(56) References Cited

U.S. PATENT DOCUMENTS

| | | | | |
|---|---|---|---|---|
| 3,995,920 | A | * | 12/1976 | Bucha ........................ 384/571 |
| 6,149,309 | A | * | 11/2000 | Wojtkowski et al. ......... 384/419 |
| 7,374,257 | B2 | * | 5/2008 | Oertley ........................ 305/136 |
| 2005/0254737 | A1 | * | 11/2005 | Scheffe et al. ............... 384/126 |
| 2006/0193544 | A1 | * | 8/2006 | Leisten et al. ................ 384/462 |
| 2008/0175523 | A1 | * | 7/2008 | Keller et al. .................. 384/107 |
| 2011/0075956 | A1 | * | 3/2011 | Wojtkowski, Jr. ............ 384/276 |

FOREIGN PATENT DOCUMENTS

| | | |
|---|---|---|
| GB | 1 380 947 | 2/1975 |
| JP | 56113821 A * | 9/1981 |

* cited by examiner

*Primary Examiner* — Thomas R Hannon
(74) *Attorney, Agent, or Firm* — Abelman, Frayne & Schwab

(57) ABSTRACT

A bearing arrangement includes a bearing for rotatably supporting a journal of a roller in a rolling mill stand, and a bearing support body with a bore for receiving the bearing. The profile of the bore in the unstressed bearing support body is configured, at least approximately, according to the negated pre-calculated profile of the bore under a load.

6 Claims, 3 Drawing Sheets

BEARING ARRANGEMENT

Figure 3:
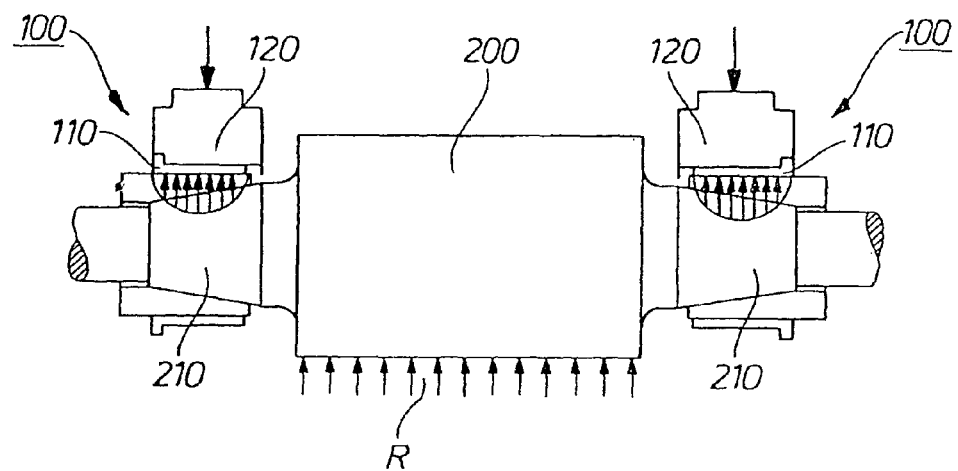
Figure 4:
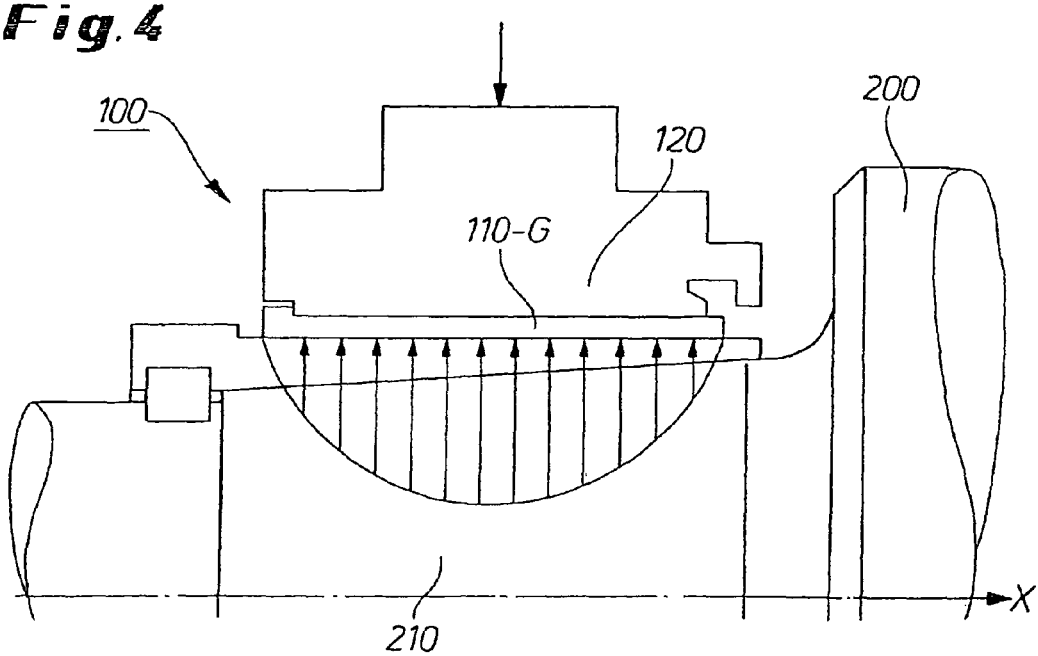

During rolling of flat and wide metal strips or during rolling of metal profiles ever increasing large rolling forces are produced which must be absorbed by bearing arrangements. According to the state-of-the art, the known bearing arrangement 100, which is shown in FIGS. 3 and 4, is so formed that a bearing 110, e.g., a sliding bearing 110-G or a roller bearing is received in an ideal cylindrical bore of a very stiff bearing support body 120, i.e., a so-called bearing chock. The working and back-up rolls 200 for rolling the above-mentioned metal strip or profile are provided at their ends with respective journals 210 which are supported in the bearings 110. FIGS. 3 and 4 show how the reactions R of the rolling forces (applied by rolled stock to the roll 200) are distributed between the opposite bearing arrangements to be absorbed by the same.

A slide bearing in form of a bearing bush or an outer ring of a roller bearing traditionally are manufactured geometrically with a very high precision, however, because of only limited available space they hardly have their own stiffness. Therefore, they require a good support that should be distributed as evenly as possible over their width, i.e., in the direction of the longitudinal axis of the journal.

Ideally, such a uniform support is insured by a bearing support body having a uniform stiffness over the bearing width or by uniformly stiff bearing chock.

Different requirements the chocks and/or the supports of rolls should meet, prevent, however, in practice, formation of bearing support bodies or chocks having a uniform stiffness over their entire width. Therefore, in practice, the bearing support bodies are formed with local pronounced support zones, so that the bearing support body, even at a uniform load, is very non-uniformly deformed over the width of the bearing seat. Non-uniform deformation of the bearing support body can occur even in the bearing support bodies having a uniform stiffness if the load is not uniform, e.g., is distributed parabolically. In each case, a non-uniform deformation adversely affects the load carrying capacity of the bearing support body and, thus, its durability because it leads to undesirable load concentrations and, i.e., certain region of the bearing become overloaded.

Proceeding from this state-of-the-art, the object of the invention is to so improve the known bearing support body that regions with a local overload over the width of the bearing arrangement are prevented.

This object is achieved with the subject matter of claim 1. The bearing support body according to the invention is characterized in that a profile of the bore in the unloaded bearing support body is formed at least approximately according to a negated profile of the bore at a pre-calculated load of the bearing support body.

The expected deformation curve, under a load, of a bearing support body, i.e., in particular, the expected, under a load, profile of the bore of the bearing support body can be pre-calculated presently very precisely with the Finite-Element-Method FEM-analysis. It depends on the distribution of the produced load and the distribution of the stiffness of the bearing support body, e.g., viewed, respectively, in the direction of the longitudinal axis of the bore. Therefore, according to the invention, it is proposed to associate a so calculated deformation curve completely or partially, e.g., with 50-90% deformation under a complete load, with a negative, negated, or complementary profile of the bore of a bearing support body in an unloaded condition in order to be able to compensate, at least partially, the deformation of the bearing support body under a load. A successful compensation reveals itself during operation, i.e., under a load, in particular, by absence in the bearing of any undesirable points with local overload.

According to a first embodiment of the invention, the bore in the unloaded bearing support body is formed, with respect to its longitudinal axis, which identical with the longitudinal axis of the bearing support body, rotationally symmetrically convex. The convex formation of the bore, i.e., the concave formation of the bearing support body on its inner side, is recommended particularly then when a greater force action is expected at the edges of the bearing support body, which is transmitted from the roll journal to the bearing support body via the bearing, than in the middle of the bearing support body. This force distribution will cause lifting of the edges of the bearing support body relative to its middle. The same deformation of the bearing support body and, thereby, of the bore can result, at the same force action, e.g., from the material of the bearing support body, viewed over its width, being softer at the edges than in the middle.

Alternatively, the bore in the unloaded bearing support body can be formed with respect to its longitudinal axis rotationally symmetrically concave. The concave formation of the bore, i.e., the convex formation of the bearing support body on its inner side, is recommended particularly then when a greater force action is expected at the height of the half-width of bearing support body, which is transmitted from the roll journal to the bearing support body via the bearing, than at the edges of the bore or the bearing support body. This force distribution will cause lifting of the middle of the bearing support body relative to its edges. The same deformation of the bearing support body and, thereby, of the bore can result, at the same force action, e.g., from the material of the bearing support body, viewed over its width, being softer in the middle than at the edges.

The claimed shape of the bore can be formed, only approximately, in simplified form of conical bores following section-wise one another, linearly continuously. The manufacturing of the bearing support body is thereby simplified.

The bearing can, e.g., be in form of a slide bearing or a roller bearing.

With formation of the bearing as a slide bearing in form of a cylindrical bearing bush, the successful, according to the invention, compensation of the deformation of the bearing support body during operation, i.e., under a load, is advantageously revealed in that in the transitional region between the bearing bush and the roll journal, possibly over the entire depth/width of the bore, a lubrication gap with a uniform thickness is formed.

When the bearing is formed as a roller bearing, the bearing has an outer ring that is received in the bore of the bearing support member, an inner ring that sits on the roll journal or the journal bush, and rolling bodies arranged between the outer and inner rings. A successful, according to the invention, compensation of the deformation of the bearing support body is revealed, during operation, i.e., under load, advantageously in that the inner ring and the outer ring, as functional surfaces, are arranged, over their entire width or the entire width of the bore in the bearing support body, coaxially or parallel to each other. Then, there is no objectionable local overload.

The bearing support body typically represents a housing for the bearing in form of chock. Typically, it connects the roll with the rolling mill stand.

The invention relates to bearing arrangement for rolls supported at both sides with a length/diameter ratio (L/D ratio) of 65-100%.

Figure 1A:
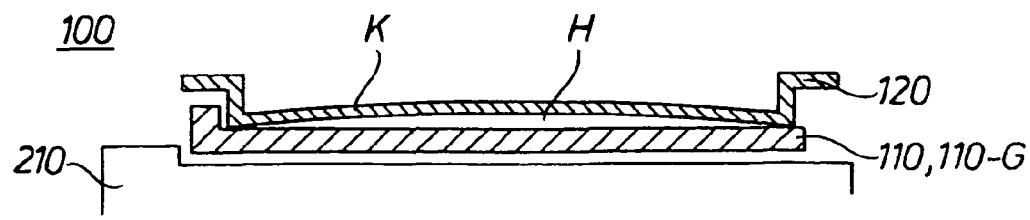
Figure 1B:
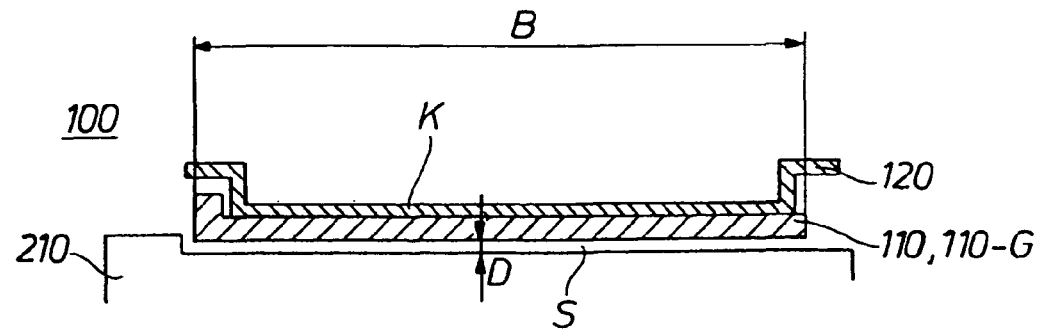
Figure 2A:
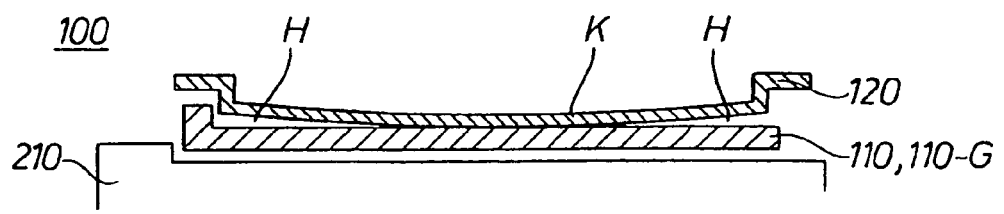
Figure 2B:
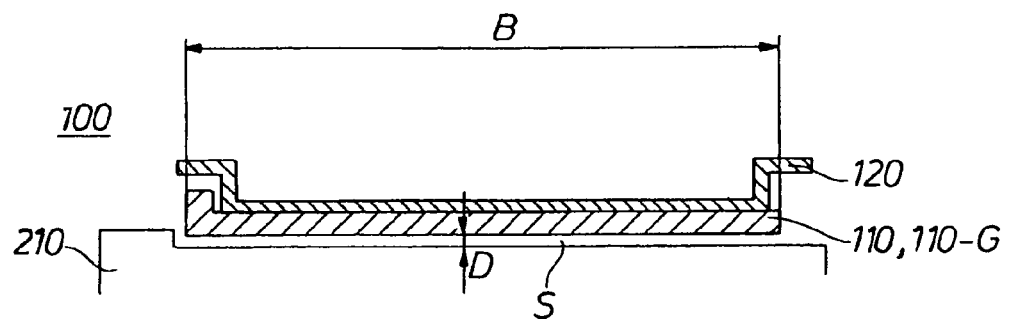

The description is accompanied by four figures, wherein it is shown in:

FIG. 1a an inventive bearing arrangement according to a first embodiment of the invention with a convex bore in a bearing support body in an unloaded condition;

FIG. 1b the bearing arrangement according to FIG. 1a in a loaded condition;

FIG. 2a an inventive bearing arrangement according to a second embodiment of the invention with a concave bore in a bearing support body in an unloaded condition;

FIG. 2b the bearing arrangement according to FIG. 2a in a loaded condition;

FIG. 3 a roll with a two-sided support (prior art); and

FIG. 4 a detail view of FIG. 3 relevant to the bearing arrangement (prior art).

The invention will be described in detail below with reference to the above-described figures. In all of the figures, the same technical features are designated with the same reference numerals.

FIG. 1a shows a first embodiment of the bearing arrangement according to the invention with a convex profile K of the bore in the bearing support body 120 in an unloaded condition. Alternatively: the bearing support body is formed concave. The bearing is formed, in the first embodiment shown in FIG. 1a, as a slide bearing, wherein the reference numeral 110-G shows the slide bearing in form of a bearing bush located between the bearing support 120 and a journal 210 or a journal bush 210 with a conical journal of a supported roll. The convex formation of the bore, in the bearing support body is shown in FIG. 1a by the vaulted hollow space H between the unloaded bearing support body 120 and the slide bearing 110-G.

FIG. 1b shows the arrangement in FIG. 1a in a loaded condition. The loading is typically caused by a force action transmitted from roll journal to the bearing support body by the bearing. The convex formation of the bore in the bearing support member, which is shown in the first embodiment, is recommended in particular then when a smaller radial force action in the region of the half of the width B of the bearing support body then at the edges should be taken into account. The convex formation of the bore is also recommended when the material at the edges of the bearing support body is softer, i.e., less rigid than in the region of the width middle.

As shown in FIG. 1b, the vaulted hollow space between the bearing support body 120 and the bearing slide body 110G disappeared under the load. Advantageously, the deformation of the bearing support body under the load, as shown in FIG. 1b, has no negative effect on the configuration of the lubrication gap S and, in particular, does not lead to a local narrowing of the lubrication gap in the region of the half-width B of the bearing support body. This one is formed cylindrical under load with a uniform distribution of thickness D over the entire width B of the bearing support body.

FIGS. 2a and 2b show a second embodiment of the invention, wherein the bore in the bearing support member is formed concave, i.e., the bearing support body itself is formed convex. Such concave shape of the bore is recommended particularly then when a smaller force action at the edges of the bearing support body than in the middle is expected or when the material of the bearing support body at its edges is harder, i.e., is less pliable than in the middle, i.e., at half-height of its width B.

FIG. 2a shows the concave formation of the bore in the bearing support member in the unloaded condition. The concave formation is shown in form of a conical surface of the hollow space H, as it approaches the middle or half-width B of the bearing support body 120.

Alternatively to FIG. 2a, FIG. 2b shows the inventive bearing arrangement in a loaded condition. The hollow space H between the sliding body 110G and the profile K of the bearing support body 120 disappeared as a result of deformation of the bearing support body caused by force action. Advantageously, this deformation of the bearing support body under load has no negative effect on the configuration of the lubrication gap, compare with FIG. 2b. This one remains advantageously with uniform thickness distribution over the entire width B of the bearing support body.

The following is valid for both embodiments according to FIGS. 1 and 2: the occurring loading of the bearing arrangement, if necessary, is completely compensated by a suitable deformation of the bearing support body and the resulting complementary deformation of the bore, and which, according to the invention, has no negative effect on the configuration of the lubrication gap. Therefore, the inventive formation of the bore in the bearing support member prevents an undesirable local excessive load in the bearing.

The invention claimed is:

1. A bearing arrangement (100), comprising:
    a bearing (110) for rotatably supporting a journal (210) of a roll (200) in a rolling mill stand; and
    a bearing support body (120) having a bore for receiving the bearing,
wherein a profile (K) of the bore in the unloaded bearing support body is formed at least approximately according to a negated profile of the bore at a pre-calculated load of the bearing support body,
characterized in that
the bore in the bearing support body (120) is formed of conical bores following sectionwise one another and linearly continuously.

2. A bearing arrangement (100) according to claim 1, characterized in that
the bore in unloaded bearing support body is formed rotationally symmetrically convex.

3. A bearing arrangement (100) according to claim 1, characterized in that
the bore in the unloaded bearing support body is formed rotationally symmetrically concave.

4. A bearing arrangement (100) according to claim 1, characterized in that
the bearing (110) is formed as a slide bearing (110-G) in form of a bearing bush for rotatably supporting the journal (210) of the roll (200), wherein a cylindrical lubrication gap (5) is formed between the bearing bush and the roll journal.

5. A bearing arrangement according to claim 1, characterized in that
the bearing (110) is formed as a roller bearing for rotatably supporting the roll journal (210).

6. A bearing arrangement (100) according to claim 1, characterized in that
the bearing support body (120) represents a housing for the bearing in form of a bearing chock that is connected with the rolling mill stand.

* * * * *